(12) United States Patent
Fox

(10) Patent No.: US 6,304,550 B1
(45) Date of Patent: Oct. 16, 2001

(54) SYSTEM AND METHOD FOR BROADCAST CONTROL OF A DATA TRANSMISSION SYSTEM

(75) Inventor: David L. Fox, Allen, TX (US)

(73) Assignee: Alcatel USA, Inc., Plano, TX (US)

( * ) Notice: Subject to any disclaimer, the term of this patent is extended or adjusted under 35 U.S.C. 154(b) by 0 days.

(21) Appl. No.: 09/149,905

(22) Filed: Sep. 8, 1998

Related U.S. Application Data

(63) Continuation of application No. 08/587,935, filed on Jan. 17, 1996, now abandoned.

(51) Int. Cl.[7] .................................. H04J 3/24; H04J 3/00
(52) U.S. Cl. ......................... 370/230; 370/411; 370/393; 370/473
(58) Field of Search .................................. 370/230, 231, 370/235, 252, 389, 392, 393, 394, 400, 401, 411, 465, 466, 470, 471, 473, 474, 498, 537–561

(56) References Cited

U.S. PATENT DOCUMENTS

| | | | |
|---|---|---|---|
| 5,206,863 | * 4/1993 | Nazarenko et al. | 714/752 |
| 5,247,516 | 9/1993 | Bernstein et al. | 370/82 |
| 5,276,425 | 1/1994 | Swanson et al. | 340/826 |
| 5,383,187 | * 1/1995 | Vardakas et al. | 370/312 |
| 5,436,890 | 7/1995 | Read et al. | 370/58.2 |
| 5,483,532 | 1/1996 | Eriksson | 370/79 |
| 5,521,915 | 5/1996 | Dieudonne et al. | 370/60.1 |
| 5,521,921 | 5/1996 | Murai | 370/82 |
| 5,550,593 | 8/1996 | Nakabayashi | 348/465 |

OTHER PUBLICATIONS

Charles Clos, "A Study of Non–Blocking Switching Networks", Bell System Technical Journal, Mar. 1953, pp. 406–424.

* cited by examiner

Primary Examiner—Ricky Ngo
(74) Attorney, Agent, or Firm—Baker Botts L.L.P.

(57) ABSTRACT

A system for broadcasting data (30) that includes a message flow optimizer (150) that forms a single concatenated message (180) from a number of discrete messages (190, 200), and a number of broadcast message receivers (250) operable to isolate a portion of the single concatenated message (180).

11 Claims, 7 Drawing Sheets

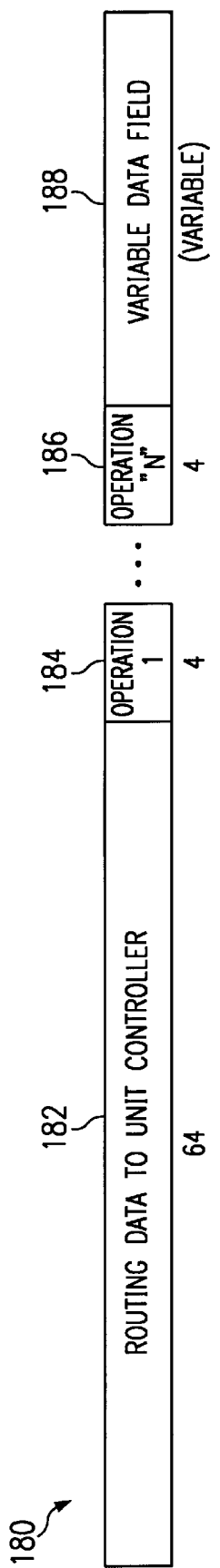

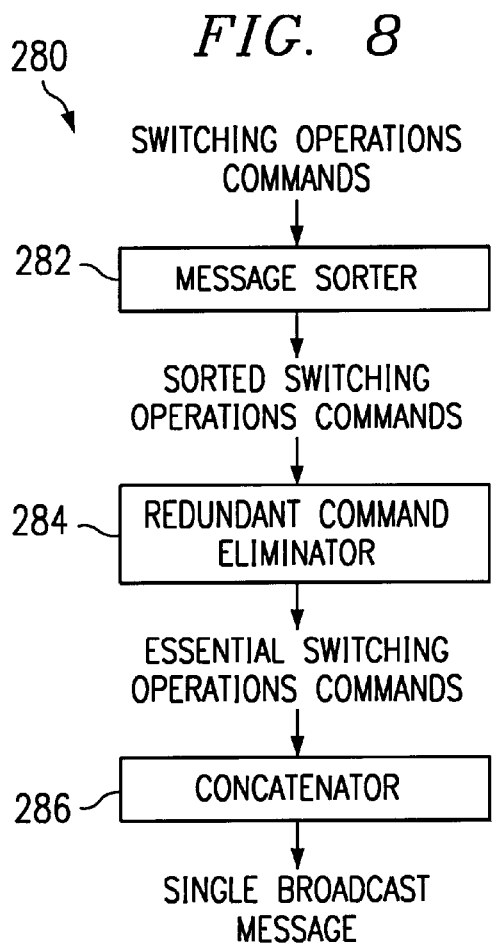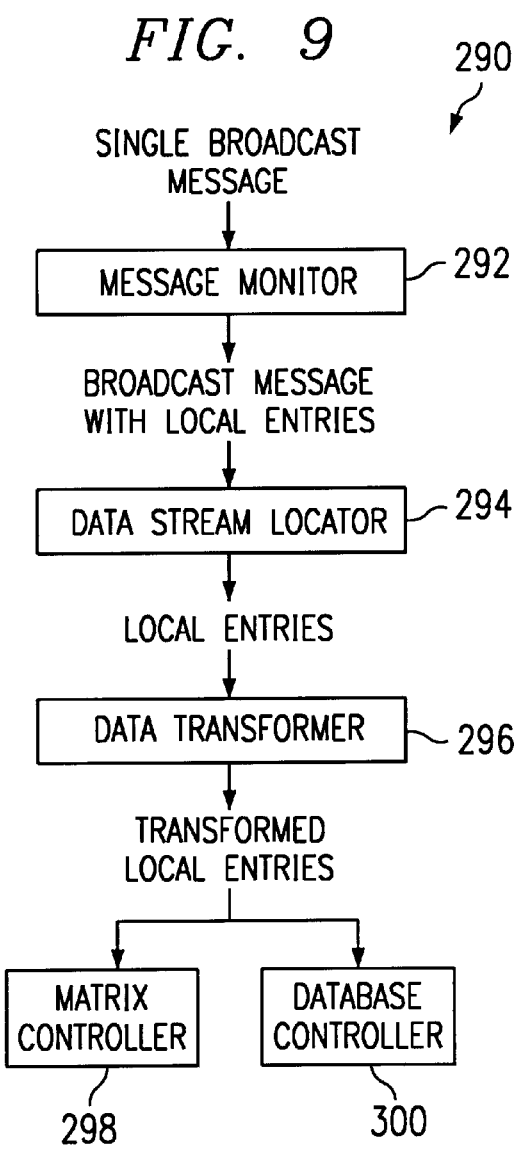

SYSTEM AND METHOD FOR BROADCAST CONTROL OF A DATA TRANSMISSION SYSTEM

CROSS-REFERENCE TO RELATED APPLICATIONS

This application is a continuation of U.S. application Ser. No. 08/587,935 filed Jan. 17, 1996 by David L. Fox and entitled "System and Method for Broadcast Control of Data Transmission System," abandoned.

TECHNICAL FIELD OF THE INVENTION

This invention relates in general to the field of data transmission, and more particularly to a system and method for broadcast control of a data transmission system.

BACKGROUND OF THE INVENTION

In the field of telephone switching systems, modern systems typically include a common control section that manages the call connection process, and a switching matrix that makes the connections. The common control section typically includes such equipment as electronic hardware modules, digital switching components, and computer controls. The switching matrix typically includes an M×N switch having M input ports and N output ports and functional to connect any one of the M input ports to any one of the N output ports. The routing of calls through the switching matrix is accomplished by the common control section.

A digital cross-connect (DCC) system is a specialized switching system that provides improved flexibility in switching services. An example of a modern DCC system is provided by U.S. Pat. No. 5,436,890 to Read et al., entitled "Integrated Multirate Cross-Connect System," assigned to DSC Communications Corporation, issued Jul. 25, 1995 (hereinafter "Read"). Such DCC systems may include a plurality of devices that define the M input ports and N output ports, an M×N connection matrix switch operable to connect any of the M input ports to any of the N output ports, and an administration subsystem that provides synchronization, monitoring, and control for remapping of the connection matrix. In addition, the DCC system taught in Read contains redundant parallel planes of all components, such that the DCC system can experience a number of failures in both planes without loss of network traffic.

The potentially large number of components in a DCC system with redundant parallel planes complicates the control of DCCs and the communication of data between components of the DCC system. If individual control messages are sent to each component, the amount of data traffic can delay re-configuration of the DCC system. When the DCC system has redundant parallel planes, as taught in Read, DCC system control may be further complicated because the number of messages is doubled.

A similar problem may be encountered with any other system that utilizes a large number of discrete components that receive data or control commands from a centralized location. For example, air traffic control systems, cellular telecommunications systems, and distributed controls systems may experience service delays or failure because of data transmission delays.

SUMMARY OF THE INVENTION

Therefore, a need has arisen for a system and method for broadcast control of a data transmission system. More specifically, a system and method for broadcast control of a data transmission system is required that allows data and control commands to be broadcast to multiple discrete components in the system.

Accordingly, one aspect of the present invention is a system for broadcasting data that includes a message flow optimizer that forms a single concatenated message from a number of discrete messages and a number of broadcast message receivers operable to isolate a portion of the single concatenated message.

Another aspect of the present invention is a system for broadcasting data that includes a message flow optimizer that forms a single concatenated message from a number of discrete messages. The message flow optimizer further includes a message sorter that sorts the discrete messages according to user-specified data fields prior to forming the single concatenated message, and a concatenator that forms a four byte operation message from each of the discrete messages. The system also includes a number of broadcast message receivers that isolate a portion of the single concatenated message. Each broadcast message receiver includes a data transformer that transforms data for a first system into data for a second system, a matrix controller that updates connections in a switching matrix, a database, and a database controller that updates the database.

Yet another aspect of the present invention is a method for broadcasting data that includes the steps of concatenating a plurality of discrete messages into a single broadcast message, and processing the broadcast message with a local processor to isolate that portion of the message addressed to the local processor.

One important technical advantage of the present invention is the ability to broadcast control commands to the individual control system components, thus decreasing the amount of processing of control commands required by the central processor and increasing control system speed.

Another important technical advantage of the present invention is the ability to use the data processing capability of distributed controls system components to perform data processing functions that would otherwise need to be performed by the central processor, thereby decreasing the amount of time required by the central processor to transmit data.

Yet another important technical advantage of the present invention is the ability to transmit data over a network using a single broadcast message instead of a plurality of discrete messages, thus greatly decreasing the amount of addressing data that must be transmitted over the network and increasing the availability of the network for use by the components connected to the network.

BRIEF DESCRIPTION OF THE DRAWINGS

For a more complete understanding of the present invention and advantages thereof, reference is now made to the following description taken in conjunction with the accompanying drawings, wherein like reference numerals represent like parts, in which:

FIGS. 6A, 6B, and 6C are exemplary message concatenation methods according to the present invention;

FIG. 8 is a block diagram of a high level message flow optimizer according to the present invention; and FIG. 9 is a block diagram of a broadcast message receiver according to the present invention.

DETAILED DESCRIPTION OF THE INVENTION

In order to better describe the present invention, the invention will be applied to data transmission requirements for a DCC system. It is understood that the invention may also be applied in a variety of other applications that involve the transmission of data to a plurality of discrete locations or devices.

Figure 1:
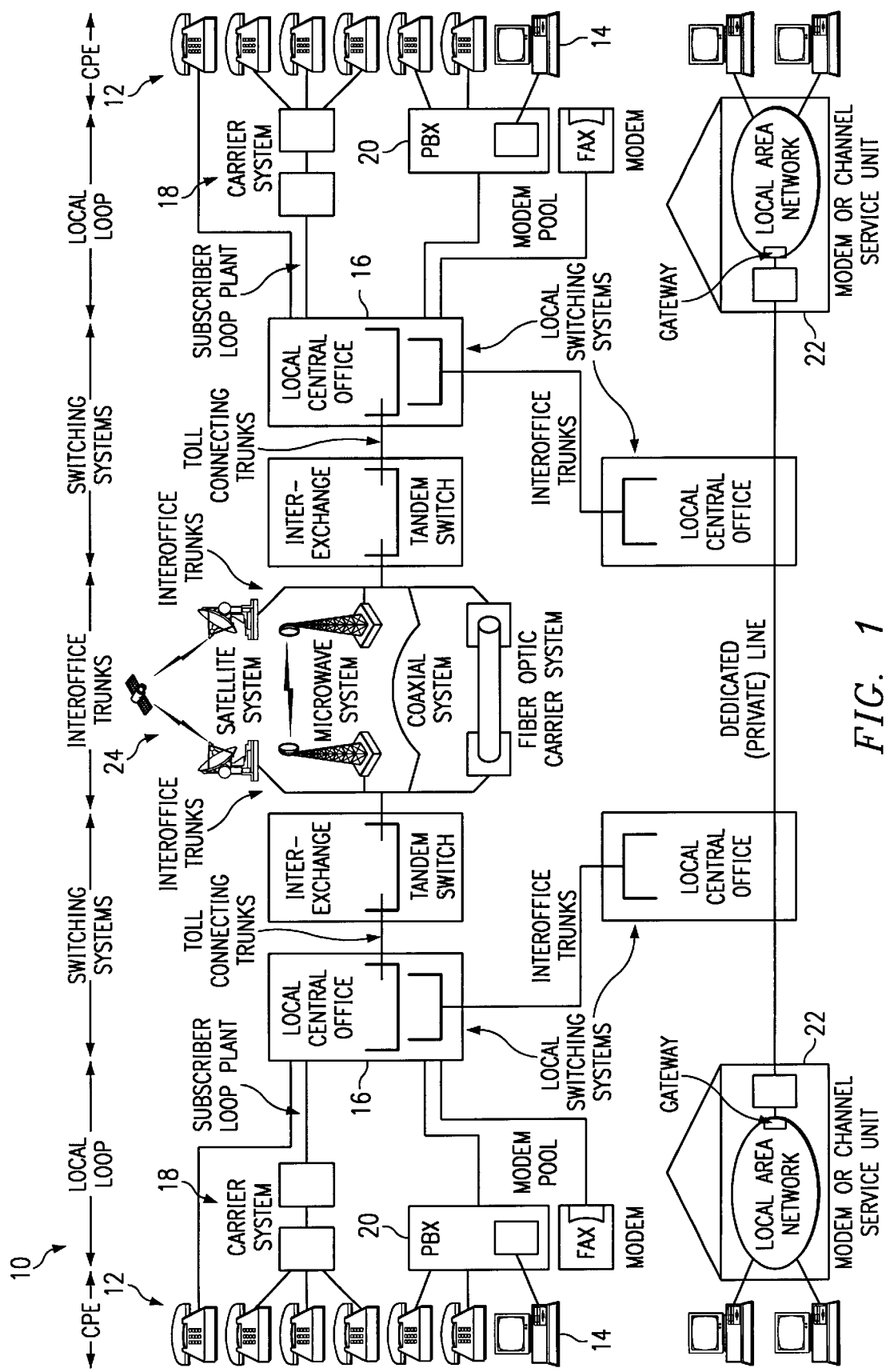
FIG. 1 shows an example of a modern telecommunications network.

FIG. 1 shows an example of modern telecommunications network 10. A plurality of telephones 12 or digital data stream sources 14 are connected to local central office 16 through carrier system 18, private branch exchange 20, local area network 22, or other distributed communications data sources. Local central office 16 is functional to connect subscribers operating within local central office 16 and is further functional to connect subscribers from local central office 16 to other subscribers through interoffice trunks 24. Interoffice trunks 24 may include satellite systems, microwave systems, coaxial systems, and fiber optic carrier systems. A DCC system is typically used at local central office 16, but may also be used at carrier system 18, private branch exchange 20, or other locations that are not explicitly shown in FIG. 1.

Figure 2:
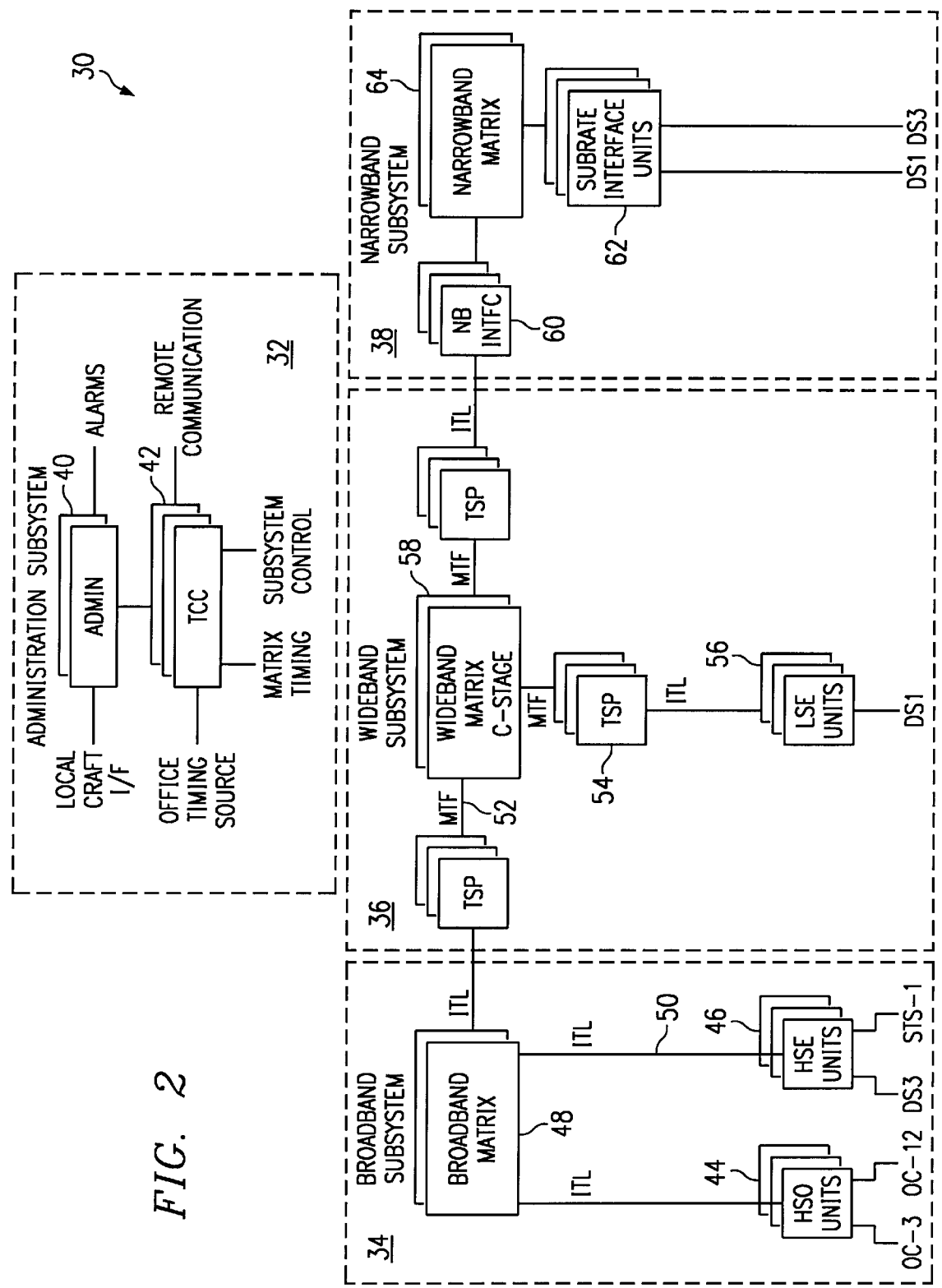
FIG. 2 shows an exemplary high level system architecture for a digital cross-connect system.

FIG. 2 presents a high level system architecture of a DCC system 30. DCC system 30 provides an integrated platform for cross-connecting signals at broadband, wideband, and narrow band levels and supports cross-connection of both domestic and international rates and formats. For purposes of this description, discussion is limited to domestic signaling at DS0, DS1, DS3, STS-1, OC3, and OC12 rates, though DCC system 30 may also process signals at other rates.

DCC system 30 terminates synchronous optical (OC3, OC12), synchronous electrical (STS-1), and asynchronous electrical (DS3, DS1) network signals. Cross-connection is provided via a multi-rate, multi-subsystem architecture that insures maximum flexibility at all network levels. With multiple subsystems under a single administration control, DCC system 30 manages individual high capacity, non-blocking matrix subsystems in order to perform cross-connections. DCC system 30 includes an administration subsystem 32 and matrix subsystems including a broadband subsystem 34, a wideband subsystem 36 and a narrowband subsystem 38.

Administration subsystem 32 includes an administration unit 40 and a timing/communication controller (TCC) unit 42. Administration unit 40 performs operations, administration, maintenance, and provisioning (OAM&P) functions for DCC system 30. Administration unit 40 also provides communications interfaces to users and with central office discrete signals. Administration unit 40 handles system control for DCC system 30 through a hierarchical distribution scheme among the various components of the system, as described below.

Timing/communications controller (TCC) unit 42 provides communications and timing functions for DCC system 30. TCC unit 42 may receive an office timing source to generate the internal timing for synchronizing broadband subsystem 34, wideband subsystem 36, and narrowband subsystem 38. TCC unit 42 further controls each component within DCC system 30 through an hierarchy of controllers as supervised by administration unit 40. Timing synchronization may also be derived from network signals for distribution to each subsystem. Synchronization and control information from administration unit 40 are distributed throughout DCC system 30 by TCC unit 42.

Broadband subsystem 34 includes high speed optical (HSO) units 44 and high speed electrical (HSE) units 46 that are coupled to a broadband matrix unit 48. HSO units 44 and HSE units 46 are data transceivers. Broadband system 34 supports network termination of signals including DS3, STS-1, OC3, and OC12 signals as well as international termination capability. Internal transmission link 50 carries optical signals and permits flexibility in physical arrangement and location of DCC system 30 components.

Wideband subsystem 36 signals are cross-connected at VT1.5 through VT6 rates into internal synchronous channels 52 having a wideband matrix transport format (MTF) of a matrix payload envelope capable of carrying the VT-rated signal. Higher rate network signals including DS3 and STS1 discussed in conjunction with broadband subsystem 34 will normally access wideband subsystem 36 for tributary access or switching through broadband subsystem 34 over ITLs 50 and tributary signal processing (TSP) unit 54. TSP units 54 are data transceivers.

Wideband subsystem 36 includes low speed electrical (LSE) units 56, TSP units 54, and wideband matrix center stage 58. LSE units 56 are data transceivers. Wideband subsystem 36 supports network termination of DS3 and DS1 signals as well as international termination capability. Network signals are cross-connected through wideband subsystem 36 in an internal matrix transport format.

Narrowband subsystem 38 includes narrowband interface unit 60, substrate interface units 62, and narrowband matrix unit 64. Narrowband interface units 60 and substrate interface units 62 are data transceivers. Narrowband subsystem 38 signals may be cross-connected at a DS0 rate. An optional substrate interface unit 62 provides direct electrical termination of signals at the DS1 and DS3 rates. However, instead of direct signal termination, narrowband subsystem 38 normally accesses network traffic through wideband subsystem 36.

DCC system 30 may use redundant data paths in coupling each component together to increase operational reliability. Each subsystem may be organized in dual independent planes with no cross-coupling within the planes. In this configuration, each HSO unit 44, HSE unit 46, LSE unit 56, TSP unit 54, and other data transceiver within each subsystem has access to both planes and is capable of independently selecting an active plane. Thus, a number of failures can be accommodated in both planes without loss of network traffic.

Figure 3:
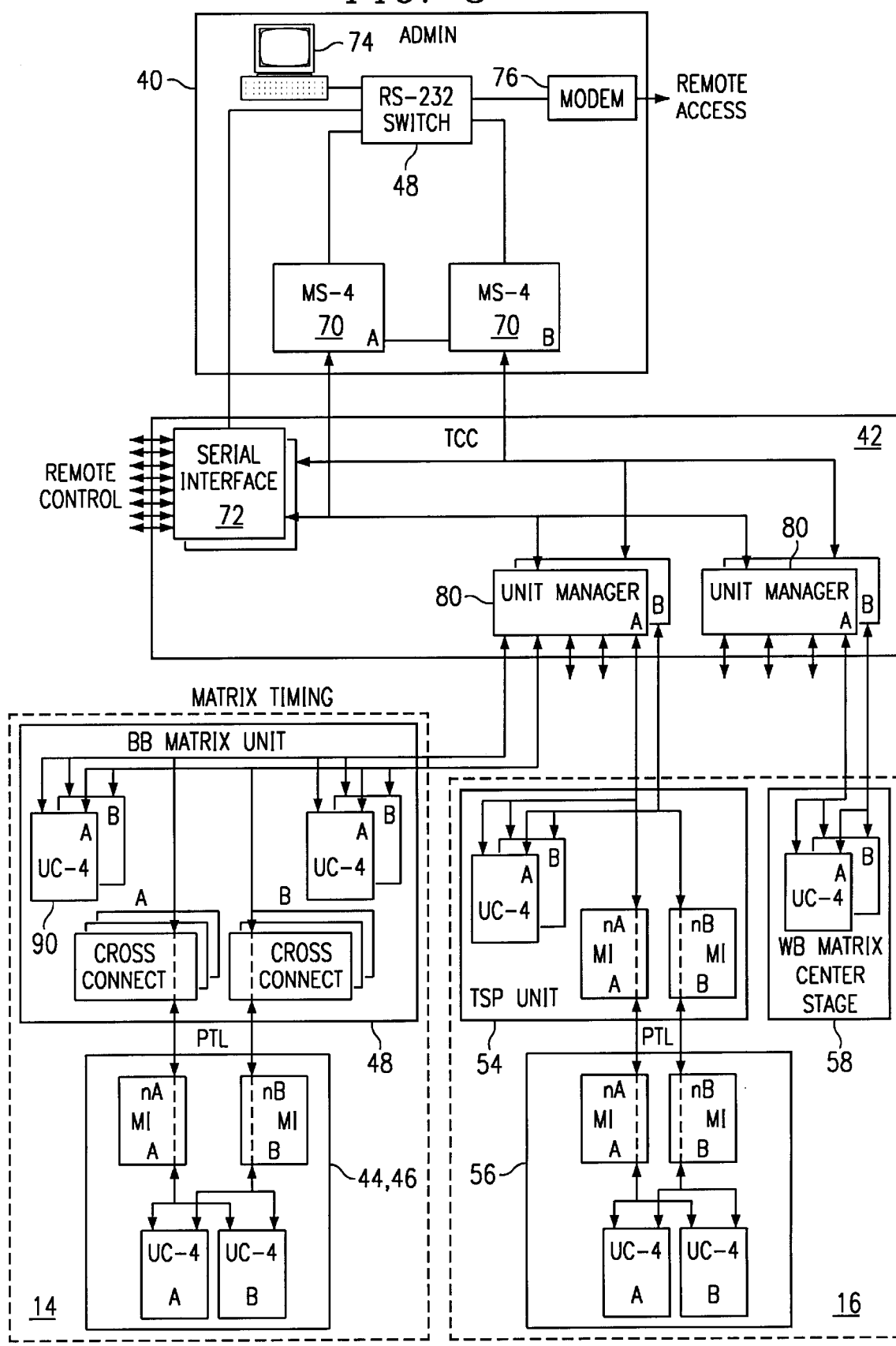
FIG. 3 is an exemplary high level view of a control structure for a digital cross-connect system.

FIG. 3 is a high level view of the control structure for DCC system 30. Top level control is found within administration unit 40 of administration subsystem 32. Administration unit 40 includes redundant processors 70 to provide the platform to perform OAM&P functions. Processors 70 perform the monitoring and control for DCC system 30. Processors 70 interface with central office discrete signals through a serial interface 72 to perform top level monitoring and control for DCC system 30. Maintenance access to processors 70 is accomplished either through a local terminal 74 or by remote access through a modem 76. An RS232 switch 78 determines whether access to processors 70 is by local or remote terminals.

The second tier in the control hierarchy is the configuration of unit managers 80 found within timing/communications control unit 42. Unit managers 80 may be used individually or in parallel to provide a redundant communications and control path between processor 70 and the third level of the control hierarchy. Intra system control information is sent from administration unit 40 to unit manager 80. Unit managers 80 provide intermediate level OAM&P functions. Communications between processors 70 and unit managers 80 may be accomplished by a network, such as a redundant Ethernet local area network (LAN). Serial interface 72 provides communications between an external source and processors 70 and unit managers 80.

The third tier of the control hierarchy is performed by unit controllers 90 located in each component of broadband subsystem 34, wideband subsystem 36, and narrowband subsystem 38. Unit controller 90 controls and monitors functions provided by the associated matrix units and performs the low level OAM&P function. Control information transmitted between unit managers 80 and unit controllers 90 may be carried on ITLs 50 or through direct cabling connections as determined by local constraints. Redundant unit controllers 90 may be found in all components of each subsystem including HSO units 44, HSE units 46, broadband matrix unit 48, LSE 56, TSP 54, and wideband center stage matrix 58.

Thus, processors 70 are connected through ITLs 50 to each other, and to unit managers 80 which are connected through ITLs 50 to unit controllers 90 within broadband matrix unit 48, HSO units 44, HSE units 46, LSE units 56, and TSP units 54. Although individual unit controllers 90 and unit managers 80 contain software that controls their individual function, coordination of all components is performed by software within processors 70 in administration unit 40.

In addition, as shown in FIG. 3, processors 70, unit managers 80, unit controllers 90, and various other components that are not explicitly shown are arranged in parallel planes "A" and "B." These planes are completely redundant, in that a number of failures may be accommodated on both planes without loss of network traffic. Processors 70 may perform data quality analysis on the redundant data channels and transmit the data channel having the highest quality of the two redundant channels.

Because of the complexity of DCC system 30, the system-controlled software that runs on controllers 70 in administration unit 40 is one of the most important components of DCC system 30. Many configurations of this software are possible. For example, some software packages that may be required to run on processors 70 and administration unit 40 include software for user interface and validation, software for connection setup, software for control of the hardware components individually or as a coordinated system, and software for determining connections between the broadband, wideband, and narrowband cross-connect matrices.

Figure 4:
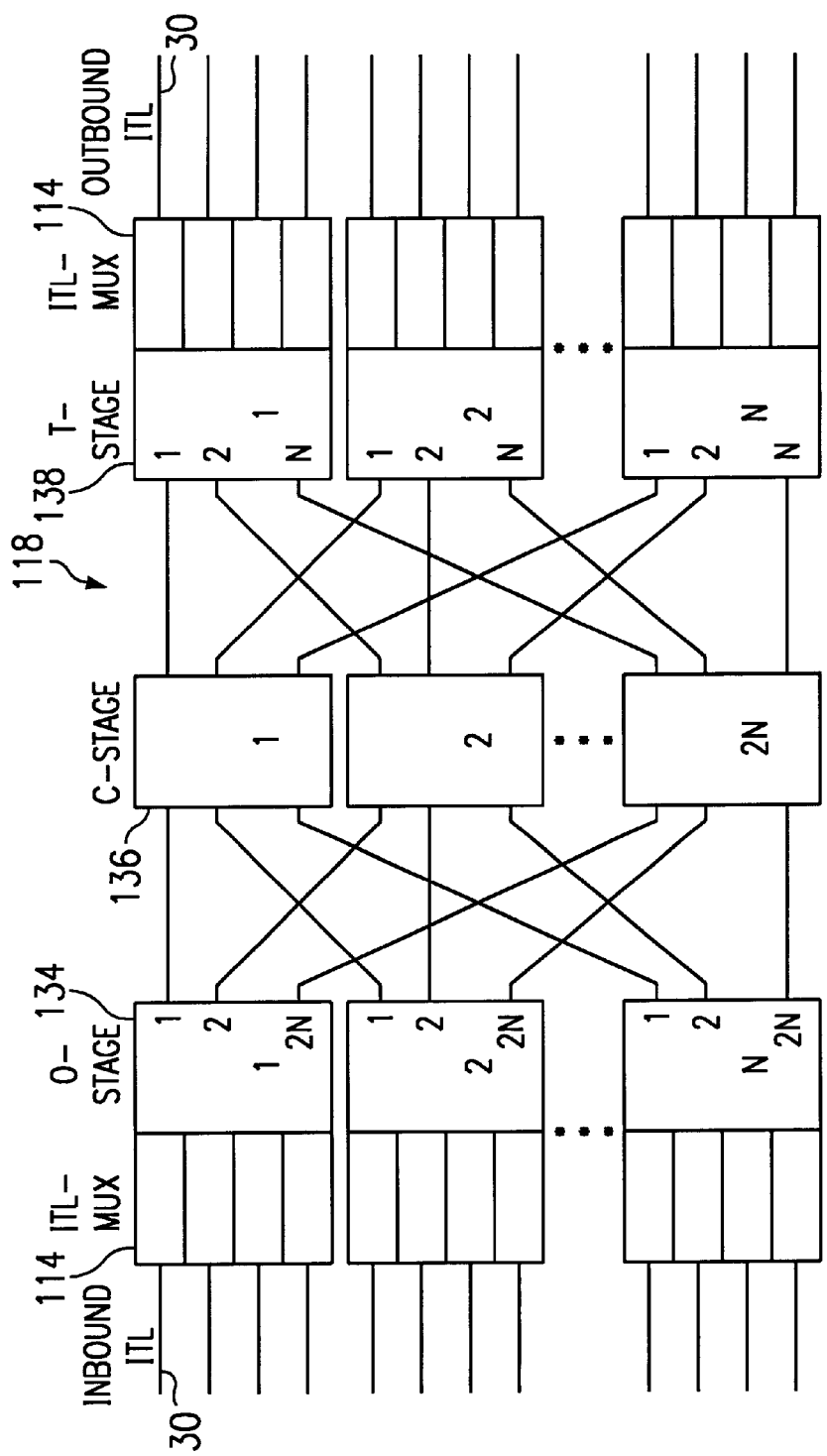
FIG. 4 is a block diagram of a cross-connect matrix.

FIG. 4 shows a block diagram of cross-connect matrix 118. Cross-connect matrix 118 uses a three-stage architecture capable of switching M input ports to N output ports. The three matrix stages for cross-connect matrix 118 are designated as originating stage 134, center stage 136, and terminating stage 138, each of which may be a plurality of discrete devices. In broadest terms, originating stage 134, center stage 136, and terminating stage 138 are data transceivers. ITL multiplexers (ITL-MUXs) 114 are directly connected to originating stage 134 and terminating stage 138 of cross-connect matrix 118. Connections are made from originating stage 134 and terminating stage 138 to center stage 136.

Administration unit 40 receives routing data for cross-connect matrix 118 through RS-232 switch 78 from serial interface 72, local terminal 74, or modem 76. In the absence of a system and method for broadcast control of the DCC system, administration unit 40 must transmit individual switching operations commands to each individual unit controller 90 over ITLs 50, thus requiring individual message processing and tracking by administration unit 40. Transmission of individual commands also increases the amount of addressing and control data that must be transmitted over the network formed by ITLs 50, thus decreasing the data transmission capacity of ITLs 50.

Figure 5:
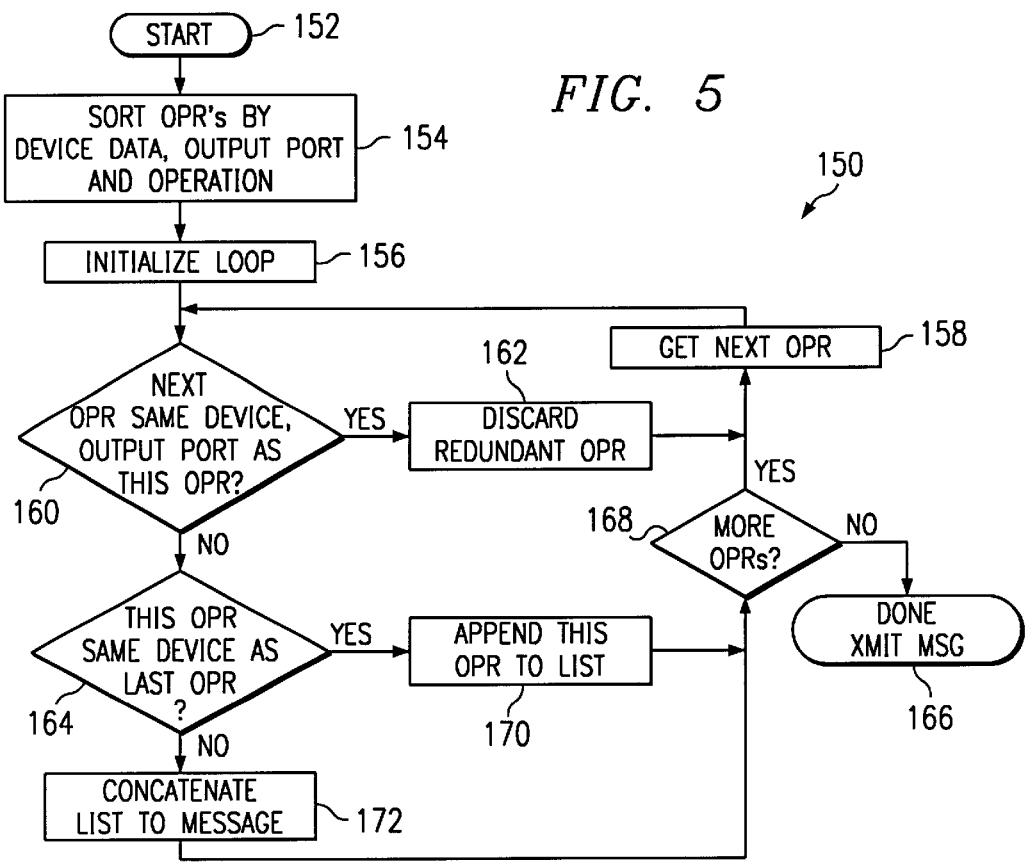
FIG. 5 is an exemplary flowchart of a high level message flow optimizer according to the present invention.

FIG. 5 is a flowchart of a high level message flow optimizer 150 that can be used to decrease the amount of addressing and control data that is required to transmit data over the network formed by ITLs 50. Message flow optimizer 150 may be performed by processor 70 in administration unit 40. The input to message flow optimizer 150 is switching operations commands that are accumulated over a user-determined period of time. These switching operations commands contain data that identifies the device, the input port, the output port, and whether the input and output port are to be connected or disconnected. After initiating the operation of high level message flow optimizer 150 at step 152, switching operations commands are sorted at step 154 according to device data, output port, and operation (e.g. connect operations followed by disconnect operations).

Step 156 initiates a loop that forms the broadcast message. Redundant connect and disconnect commands are eliminated at steps 160 and 162. For example, this occurs when a first command requires a first switch port to be disconnected from a second switch port, and a second command requires a third switch port to be connected to the second switch port. Thus, the first command is redundant, since the first switch port must be disconnected from the second switch port in order for third switch port to be connected to the second switch port. Two commands are tested at step 160 to determine if the next command will connect or disconnect the same output port. If this condition exists, the redundant disconnect command is discarded at step 162, and the loop is reset for processing the next switching operation command at step 158.

If no further redundant commands need to be eliminated, high level message flow optimizer 150 then enters a loop at step 164 that groups all switching operation commands going to the same device. When a switching operation command is read that goes to a new device as opposed to the previous device of the last switching operation command, all of the switching operation commands going to the previous device are concatenated into a four byte operation message at step 172. Otherwise, the switching operation commands are added to a list of commands going to the device at step 170. The presence of more switching operations commands is tested for at step 168. If no further switching operation commands are present, then the single broadcast message is transmitted at step 166.

FIGS. 6A, 6B, and 6C include examples of the four byte operation messages formed at step 172 in FIG. 5. FIG. 6A shows an example of single concatenated message 180 for all control data going to all unit controllers. This message may also include other broadcast messages (not explicitly shown) that do not contain control data for unit controllers, which may be appended to single concatenated message 180. Unit controllers 90 are operable to scan the broadcast message and isolate routing data 182. Single concatenated message 180 also contains four byte operation messages 184 through 186 and variable data field 188.

Examples of four byte operation messages 184 and 186 are shown in FIG. 6B. These four byte messages contain the essential data from the discrete switching commands that must eventually be transmitted to unit controllers 90. Four byte operation message 190 contains two byte device data block 192, followed by one byte input port identifier 194 and one byte output port identifier 196. Four byte operation message 200 contains two byte device data block 202 and two byte pointer 204, which identifies the location of data in variable data field 188.

FIG. 6C shows several examples of data formats for use in variable data field 188 shown in FIG. 6A. In data format 210, first one byte block 212 shows the size of the variable data field associated with a given device. Subsequent one byte blocks 214, 216, 218 and 220 are pairs of input and output port identifiers that are to be connected by cross-connect matrix 118. In data format 230, first one byte block 232 shows the size of the variable data field associated with a given device. Subsequent one byte blocks 234 and 236 contain the endpoints of a continuous list of input ports (e.g. 1, 4 for the list 1, 2, 3, 4), and a list of one byte blocks of the associated output ports for each input port in the list. For example, if the input-output port pairs 1-12, 2-19, 3-7, and 4-32 were to be transmitted, data format 210 for this data would read [8, 1, 12, 2, 19, 3, 7, 4, 32], and data format 230 for this data would read [6, 1, 4, 12, 19, 7, 32]. Those skilled in the art will appreciate that concatenator 172 may use other formats besides four byte operation messages 190 and 200 to form single concatenated message 180 without departing from the scope and intent of the present invention.

Figure 7:
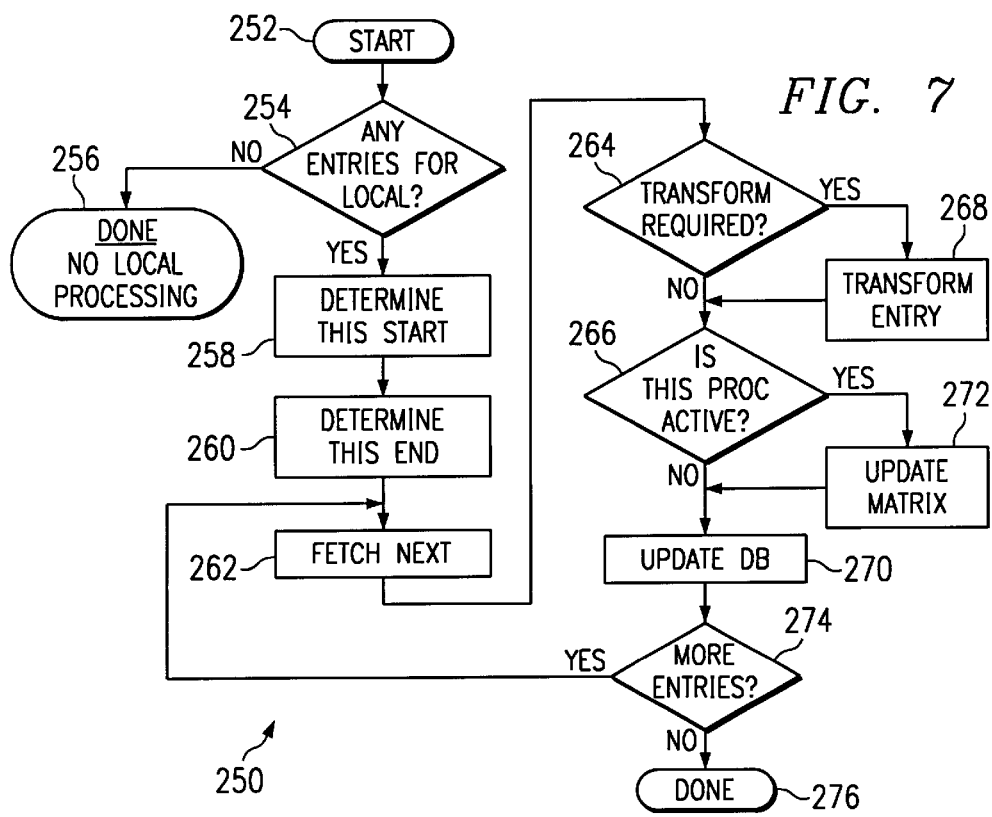
FIG. 7 is a flowchart that describes an exemplary broadcast message receiver operation in a system and method for broadcast control of a data transmission system.

FIG. 7 is a flowchart that describes broadcast message receiver operation in a system and method for broadcast control of a data transmission system. Broadcast message receiver control 250 may operate within each of unit controllers 90 and is initiated at step 252. At step 254, unit controller 90 monitors the broadcast message for local entries, as identified by routing data to unit controllers 182 from FIG. 6A. If no local entries are found, the broadcast message receiver control ends at step 256 until the transmission of a new broadcast message begins. If local entries are found, broadcast message receiver control 250 determines the local starting entry and ending entry for the present unit controller 90 at steps 258 and 260. As shown in FIG. 5, the entries in single concatenated message 180 are sorted by device data and input port. Thus, the local starting entry and ending entry will define the boundaries of the data in the message stream that pertain to a given unit controller 90 when the device data for all unit controllers 90 in DCC 30 are in numerical order. After the local starting entry and ending entry are determined, broadcast message receiver control 250 enters a matrix and database update loop at step 262.

The first step in the update loop is to determine whether a transform is required at step 264. A transform may be required for many reasons, for example, if DCC 30 contains parallel planes in which the components are not configured identically. If a transform is required, the entry is transformed at step 268. The next step in the update loop is to determine whether the present unit controller 90 is active. This step may be required for many reasons, such as when DCC 30 contains parallel planes and when matrix 48 of any inactive plane is not updated, or when a load sharing strategy is used and the unit controller 90 must determine whether it is controlling the device active. If the processor of the present unit controller 90 is active, matrix 48 is updated at step 272. This matrix update may occur in parallel with subsequent processing in the loop of FIG. 7, because each unit controller 90 is operable to update switch connections simultaneously. The database of unit controller 90 is updated at step 270. Further entries are detected at step 274, and broadcast message receiver control 250 is completed at step 276 when all entries have been processed.

FIG. 8 is a block diagram of a high level message flow optimizer according to the present invention, which may be present within processor 70 of administration unit 40. Message sorter 282 receives discrete switching operations commands and sorts the commands according to user-specified criteria, such as by device data, input port, switching operation, and output port. Redundant command eliminator 284 receives the sorted switching operations commands and outputs the essential (i.e. non-redundant) switching operations commands. Concatenator 286 receives the essential switching operations commands and outputs a single broadcast message.

FIG. 9 is a block diagram of a broadcast message receiver according to the present invention, which may be present within unit controller 90. The single broadcast message is received by message monitor 292. If the broadcast message contains local entries, it is forwarded to data stream locator 294, which isolates the local entries in the broadcast message. Data transformer 296 transforms the local entries if required. The transformed local entries are then used to update matrix 118 by matrix controller 298 and to update the database of unit controller 90 by database controller 300.

Although the present invention has been described in detail, it should be understood that various changes, substitutions, and alterations can be made hereto without departing from the spirit and scope of the invention as defined by the appended claims.

What is claimed is:

1. A system for broadcasting data, comprising:
    a message flow optimizer operable to form a single concatenated message from a plurality of discrete messages, each discrete message being grouped with other discrete messages having a same destination, the message flow optimizer further comprising:
        a message sorter operable to sort the discrete messages according to user-specified data fields prior to forming the single concatenated message; and
        a concatenator operable to form an operation message from the discrete messages; and
    at least one broadcast message receiver operable to isolate a portion of the single concatenated message, each broadcast message receiver further comprising:
        a data transformer operable to transform data for a first system into data for a second system;
        a matrix controller operable to update connections in a switching matrix;
        a database; and
        a database controller operable to update the database.

2. The system for broadcasting data of claim 1, wherein the operation message contains device data followed by an input port identifier and an output port identifier.

3. The system for broadcasting data of claim 1, further comprising:
    wherein the single concatenated message contains a variable data field; and
    wherein the operation message contains a device data block followed by a pointer data block that identifies the location of a data stream associated with that device in a variable data field.

4. The system for broadcasting data of claim 3, wherein the data stream contains a first field that contains the size in bytes of the data stream, and a series of pairs of input port data and output port data.

5. A method for broadcasting data, comprising the steps of:
    grouping discrete messages having a same destination;
    concatenating at least one group of discrete messages into a single broadcast message; and
    processing the broadcast message with a local processor to isolate that portion of the message addressed to the local processor, wherein the step of concatenating further comprises the steps of:
    forming a device data block from each discrete message;
    forming an input port identifier from each discrete message;
    forming an output port identifier from each discrete message; and
    forming an operation message from the device data block, the input port identifier, and the output port identifier from each discrete message.

6. A method for broadcasting data, comprising the steps of:
    grouping discrete messages having a same destination;
    concatenating at least one group of discrete messages into a single broadcast message; and
    processing the broadcast message with a local processor to isolate that portion of the message addressed to the local processor, wherein the step of concatenating further comprises the steps of:
    forming a device data block from each discrete message;
    forming an input port identifier from each discrete message;
    forming an output port identifier from each discrete message;
    forming a data stream from each pair of input port identifiers and output port identifiers with a common device data block;
    appending a size data block to the beginning of the data stream;
    appending the data stream to a variable data field in the single broadcast message;
    forming a pointer data block that identifies the location of the data stream in the variable data field; and
    forming an operation message from the device data block and the pointer data block.

7. A method for broadcasting data, comprising the steps of:
    grouping discrete messages having a same destination;
    concatenating at least one group of discrete messages into a single broadcast message; and
    processing the broadcast message with a local processor to isolate that portion of the message addressed to the local processor, wherein the step of concatenating further comprises the steps of:
    forming a device data block from each discrete message;
    forming an input port identifier from each discrete message;
    forming an output port identifier from each discrete message;
    forming a data stream having a first input port identifier and a second input port identifier that define the endpoints of a list of input ports and at least one output port identifier that is associated each respective input port identifier in the list;
    appending a size data block to the beginning of the data stream;
    appending the data stream to a variable data field in the single broadcast message;
    forming a pointer data block that identifies the location of the data stream in the variable data field; and
    forming an operation message from the device data block and the pointer data block.

8. A method for broadcasting data, comprising the steps of:
    sorting a plurality of discrete messages;
    grouping discrete messages having a same destination;
    eliminating redundant discrete messages;
    concatenating the plurality of discrete messages into a single broadcast message;

processing the broadcast message with a local processor to isolate that portion of the message addressed to the local processor updating a switching matrix in response to the broadcast message; and updating a database in response to the broadcast message.

9. The method for broadcasting data of claim 8, wherein the step of concatenating further comprises the steps of:

forming a device data block from each discrete message;

forming an input port identifier from each discrete message;

forming an output port identifier from each discrete message; and forming an operation message from the device data block, the input port identifier, and the output port identifier from each discrete message.

10. A system for broadcasting data, comprising:

a message flow optimizer operable to form a single concatenated message from at least one discrete message;

at least one broadcast message receiver operable to isolate a portion of the single concatenated message;

wherein the message flow optimizer further comprises a concatenator operable to form an operation message from the discrete messages, wherein the single concatenated message contains a variable data field, wherein the operation message contains a device data block followed by a pointer data block that identifies the location of a data stream associated with that device in a variable data field, wherein the data stream contains a first field that contains the size in bytes of the data stream, two second fields containing the first and last identifiers of a series of input ports, and a series of identifiers of output ports.

11. A system for broadcasting data, comprising:

a message flow optimizer operable to form a single concatenated message from at least one discrete message, the message flow optimizer further comprising:

a message sorter operable to sort the discrete messages according to user-specified data fields prior to forming the single concatenated message; and a concatenator operable to form an operation message from the discrete messages; and at least one broadcast message receiver operable to isolate a portion of the single concatenated message, each broadcast message receiver further comprising:

a data transformer operable to transform data for a first system into data for a second system;

a matrix controller operable to update connections in a switching matrix;

a database; and a database controller operable to update the database;

wherein the single concatenated message contains a variable data field, wherein the operation message contains a device data block followed by a pointer data block that identifies the location of a data stream associated with that device in a variable data field, wherein the data stream contains a first field that contains the size in bytes of the data stream, two second fields containing the first and last identifiers of a series of input ports, and a series of identifiers of output ports.

\* \* \* \* \*